(12) United States Patent
Michler et al.

(10) Patent No.: US 6,257,122 B1
(45) Date of Patent: Jul. 10, 2001

(54) CLAMPING CYLINDER

(75) Inventors: Gerhard Michler, Ilsfeld; Siegfried Gulde, Langenenslingen, both of (DE)

(73) Assignee: Heinz-Dieter Schunk GmbH. & Co., Spanntecknik KG (DE)

( * ) Notice: Subject to any disclaimer, the term of this patent is extended or adjusted under 35 U.S.C. 154(b) by 0 days.

(21) Appl. No.: 09/367,182

(22) PCT Filed: Feb. 10, 1998

(86) PCT No.: PCT/EP98/00735

§ 371 Date: Aug. 9, 1999

§ 102(e) Date: Aug. 9, 1999

(87) PCT Pub. No.: WO98/35776

PCT Pub. Date: Aug. 20, 1998

(30) Foreign Application Priority Data

Feb. 12, 1997 (DE) ............................................. 197 05 362

(51) Int. Cl.[7] .............................. B21B 31/30; F01B 31/00
(52) U.S. Cl. .................................. 92/86; 92/106; 92/110; 279/4.01
(58) Field of Search .................................. 92/82, 86, 110, 92/111, 112, 109, 106; 279/4.01

(56) References Cited

U.S. PATENT DOCUMENTS

| 1,656,149 | * | 1/1928 | Hopkins | 92/106 |
|---|---|---|---|---|
| 1,684,063 | * | 9/1928 | Miller | 92/106 X |
| 2,420,626 | * | 5/1947 | Stevenson | 92/106 |
| 2,584,747 | * | 2/1952 | Sloan | 92/106 |
| 3,439,925 | * | 4/1969 | Sampson | 279/4.01 |
| 3,924,514 | | 12/1975 | Parsons et al. | 92/406 X |
| 4,040,338 | * | 8/1977 | Wilson et al. | 92/106 |
| 4,621,568 | * | 11/1986 | Gailey | 92/106 |
| 4,945,819 | * | 8/1990 | Rohm | 92/106 X |

FOREIGN PATENT DOCUMENTS 36 37 823   5/1987  (DE) .

* cited by examiner

Primary Examiner—John E. Ryznic
(74) Attorney, Agent, or Firm—The Maxham Firm

(57) ABSTRACT

The invention relates to a clamping cylinder for operating, for instance, a chuck by means of a pull pipe or pull rod installed preferably in a turning machine. The clamping cylinder has a cylinder casing (4) comprising a screwed-on cover plate (5), an axially displaceable piston (12) in the work chamber (11) of the cylinder casing (4) to produce the clamping force and a distributor (2) fixed onto one of the cylinder casing faces with ports and pressure lines for supplying and discharging a pressure oil to and from the work chamber of the piston. According to the invention, the cylinder casing (4), its lid (5) and the distributor casing are made of a light metal in order to reduce inertia moments and wear and to improve lubrication and heat dissipation. The walls of the locating bores for the piston (12) and/or its piston rods (13, 22) are hard coated. The piston and its two piston rods are made in a single piece from a tool steel and their respective contact surfaces are hard chrome coated. In order to maintain an even sealing gap (40), radial bores (40, 41) are provided in the piston rod (22) located in the distributor casing (29), one of said radial bores additionally supplying the sealing gap with oil.

7 Claims, 2 Drawing Sheets

CLAMPING CYLINDER

The invention relates to a clamping cylinder for operating the chuck of a machine tool, particularly a turning machine, comprising a cylinder casing including a cover plate fixed to its face side, a piston axially shiftable in a work chamber of the cylinder casing for generating a clamping force, the piston rod of the cylinder being capable of being coupled with the chuck, and a distributor fixed to the other face side of the cylinder casing and having ports for introducing and removing the hydraulic pressure means into and from the work chamber.

In cutting workpieces, chucks are generally used for clamping the tool or the workpiece, a rotationally symmetric component of the tool, e.g. its shaft, or of the workpiece being clamped in the chuck. Particularly in turning machines such chucks of clamping cylinders formed as hollow clamping cylinders or solid clamping cylinders are operated. Hollow clamping cylinders serve to hold rod or pipe shaped workpieces, the rod material protruding through the chuck and also the clamping cylinder. Solid clamping cylinders are used in connection with correspondingly formed collet chucks for holding short workpieces.

In cutting workpieces, an undesirable heating of the clamping cylinders occurs which has to be limited by appropriate measures such as heat dissipation, air cooling or the like. These thermal problems are connected with a possibly insufficient lubrication of the highly loaded components of the clamping cylinder which increasingly occurs particularly during a long-duration machining of workpieces, i.e. in continuous duty. The lubrication of conventional clamping cylinders and their distributors is effected by the hydraulic pressure means which is introduced into the conduit system provided in the distributor under a high pressure and is separately guided to the one or the other work chamber in the cylinder casing within the same. From the snap ring grove in the pressure carrying branch of the conduit system, a small amount of the pressure means gets into the gap between the circumferential surface of the rotating piston rod and the inner wall of the distributor housing. Since no elastically deformable sealing rings can be used in the distributor due to the high pressures and speeds, the sealing is effected by the dimensions of the narrow sealing gap itself, the necessarily occurring leakage being removed in a pressureless manner via separate bores and conduits. The leaking oil flowing off through the sealing gap serves as a lubrication and heat dissipation means. A too narrow sealing gap causes a high heat development due to an insufficient cooling effect and a low lubrication effect. Since both work chambers in the cylinder housing are alternatively provided with pressure means via two separate snap ring groves in the distributor housing as well as two separate conduits with parallel axes provided in the rotating piston rod and the two snap ring groves necessarily have a certain axial distance to each other, further an irregular distribution of the leaking oil along the axial length of the sealing gap may be caused, which in turn will give rise to an increased one-sided heating of the respective components.

In the case of clamping cylinders and their collet chucks, the aspect of the inertia occurring is also of considerable importance, particularly when those clamping elements are to be used in modern turning machines operating at high speeds. This particularly applies to hollow clamping cylinders which, due to the inner bore required for receiving the rod material, must have a correspondingly larger outer diameter and on which extremely high circumferential speeds act. To reduce the inertia of the clamping cylinders, it has been proposed to produce the important components, such as the cylinder casing and its lid, of aluminium. It has, however, been found that these embodiments undergo too much wear due to the relative softness of the Al material.

It is the object of the invention to provide a clamping cylinder for operating chucks in which the drawbacks of the state of the art are considerably reduced and which is particularly suitable for the use at high speeds due to its enhanced operation behaviour, particularly with respect to the inertia moment, the lubrication and the heat dissipation.

According to the invention, this object is achieved by forming the cylinder casing and its lid as well as the distributor from a light metal, the sliding surfaces thereof being at least partly hard coated, by forming the piston of tool steel with hard coated sliding surfaces, and by introducing the pressure means into the sealing gap between the piston rod and the distributor walls via separate bores.

The formation of the cylinder casing and its lid of a light metal enables a reduction of the weight of these components in connection with largely the same dimensions, which leads to a considerable reduction of the inertia moments occurring in the operation. The use of hard coated sliding surfaces according to the invention, particularly on the inner walls of the through bore in the distributor housing, in connection with the hard coated sliding surfaces of the piston rods results in an extreme reduction of wear, which leads to considerably enhanced operation properties, particularly continuous duty, to a more effective pressure oil in the sealing gap which is practically constant along its length, and finally to an enhanced cooling effect. An optimisation of the lubrication and cooling effects is accomplished also in that in every operating state of the clamping cylinder pressure oil is introduced into the sealing gap at two positions, respectively, i.e. on the one hand, in the conventional way, via the snap ring grove, and on the other hand via the radial bore additionally provided according to the invention and disposed in a sufficiently large axial distance to the respectively associated snap ring grove. This additional introduction of pressure oil into the sealing gap ensures a largely uniform distribution of the pressure oil along the full axial length of the sealing gap and thus excellent lubrication and cooling effects.

According to an advantageous embodiment of the invention, the heat dissipation is further intensified by a specially formed air conduction system which preferably comprises an air conduction sheet fixed to the distributor housing and partly overlapping the cylinder casing as well as outer axial groves in the distributor housing generating an intensive directed flow of cooling air.

Further particularities and aspects will become obvious from the following description of the embodiment illustrated in the drawings in which.

Figure 1:
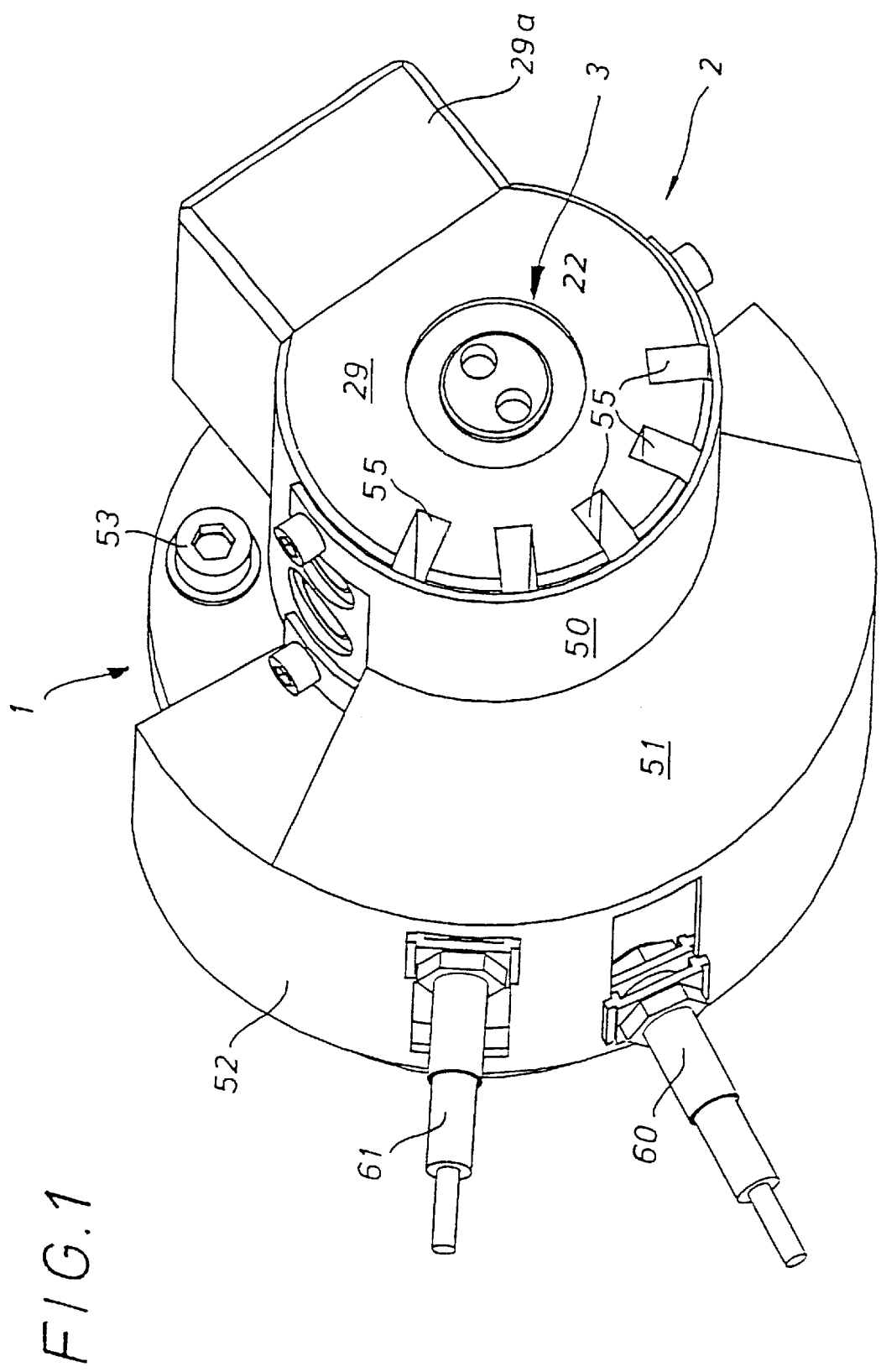
FIG. 1 shows a schematic perspective view of a solid clamping cylinder.

The solid clamping cylinder for operating a chuck shown in the drawing comprises a cylinder 1 rotating during the operation, a distributor 2 attached to a machine part for supplying a pressure means, and a piston structure 3.

Figure 2:
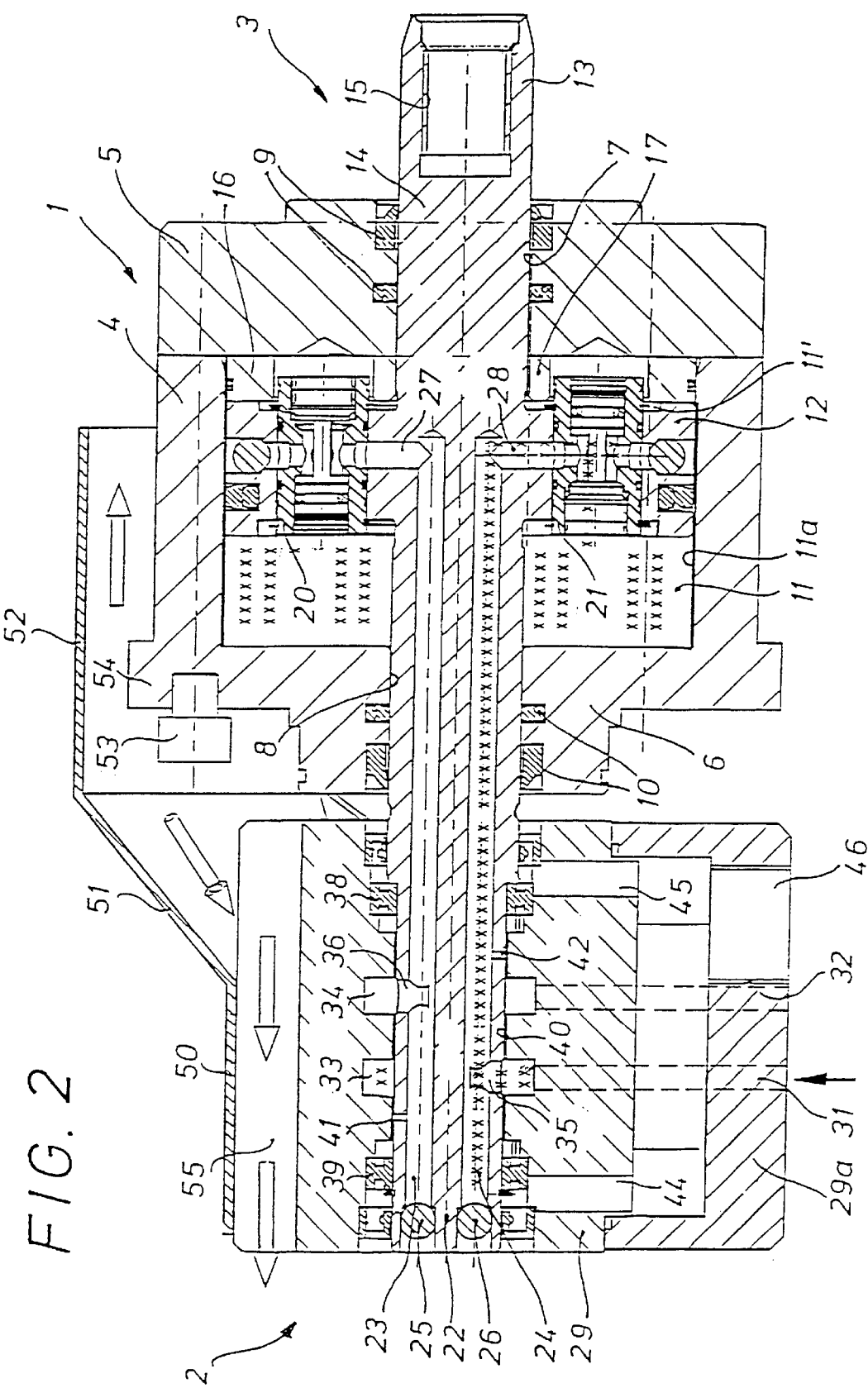
FIG. 2 shows an axial cross sectional view of the solid clamping cylinder of FIG. 1.

The cylinder 1 consists of a cylinder casing 4 to the right face of which, according to FIG. 2, a lid 5 is attached in a pressure-tight way. The lid 5 and the rear face wall 6 of the cylinder casing 4 are respectively provided with an axially centred bore 7, 8 having ring seals 9, 10. On the inside of the cylinder casing 4, a work chamber 11 is located in which a piston 12 of the piston structure 3 is positioned in an axially shiftable manner. This piston 12 is integrally formed with a piston rod 13 extending along its two sides, the right part 14 of which, according to FIG. 2, protrudes through the bore 7 in the lid 5 in a sealed manner and is provided with coupling means 15 at its end for the direct or indirect attachment a chuck. On the face of the lid 5 facing the cylinder casing 4, two ring catches 16, 17 are formed, the radially outer ring catch 17 among which centres the lid 5 in the housing and at the same time forms an end stopper for the piston 12 in its illustrated outer right end position. The radially inner ring catch 17 prolongs the guiding surface of the lid bore 7 and can also serve as an end stopper for the piston 12.

Within the piston 12, two releasable check valves 20, 21 are disposed in a diametrically opposed way in this case, which are automatically locked in case of a failure of the supply of the pressure means and thus maintain the pressure in the respective work chamber 11, 11'. The two check valves 20, 21 are substantially identically formed and built in in opposing positions. Each valve is provided with a hull mounted in an axial bore of the piston in a sealed manner, weakly spring loaded valve member being disposed in said hull in an axially shiftable way, the face of the valve member being exposed to the pressure in the respective work chamber. In case of a pressure loss in the supply of the pressure means, this valve member is pressed into a ring shaped valve seat disposed at the other end section of the respective hull against the pressure present in the work chamber. The valve member is fixedly connected to a piston provided in the other end section of the respective hull via a rod. During a switching operation, i.e. when the work chamber 11 is to be relieved and pressure oil is to be introduced into the work chamber 11', a corresponding adjustment of the two valve members is effected due to the changed pressure load on their pistons.

On the left side of the piston 12 according to FIG. 2, another piston rod 22 integrally formed with the piston 12 is provided. This piston rod 22 protrudes through the bore 8 in the rear face wall of the cylinder housing 4, the sealing rings 10 preventing a leakage of the pressure means from the work chamber 11 through the ring shaped gap between the piston rod 22 and the wall 6 of the casing. Since the components 4, 6 and 22 rotate with the same speed, the sealing rings 9 and 10 can effectively prevent a leakage of leaking oil.

In the piston rod 22 on the left side, two axial conduits 23, 24 are disposed. These conduits 23, 24 are respectively closed by a stopper 25, 26 at their end sides, and their right ends according to FIG. 2 are connected to one of the two check valves 20, 21, respectively, via a respective radial bore 27, 28 provided in the piston 12.

In the multipart casing 29, 29a of the distributor 2, two pressure conduits 31, 32 indicated by dotted lines are formed, which are connected to a suitable pressure generator and terminate in a respective snap ring grove 33, 34. One of these snap ring groves 33 is connected to the one axial conduit 24 and the other snap ring grove 34 to the second axial conduit 23 via a respective radial bore 35, 36 in the piston rod. In the operating state illustrated in FIG. 2, the conduits and spaces containing the pressure means are indicated by Xs and the arrow at the inlet of the conduit 31. Due to the pressure effective in the work space 11 the piston 12 and the piston rods 14, 22 at both sides are therefore disposed in the right end position, in which the coupling means 15 at the end of the piston rod 14 protrude maximally over the cover plate 5 and the pressure means is introduced into the work chamber 11.

The left piston rod 22 rotating together with the piston 2 and the other parts of the cylinder 1 is borne in two ball track bearings 38, 39 in the distributor housing 29. The two ball track bearings 38 and 39 ensure a continuous sealing gap 40 between the bore in the cylinder casing 29 and the circumferential wall of the piston rod 22. Into this sealing gap 40 pressure oil from the respective pressure bearing snap ring grove, in this case the snap ring grove 33, is pressed. To ensure an additional supply of pressure oil into the sealing gap 40, according to the invention, two radial bores 41, 42 are formed in the piston rod, which bores 41, 42 respectively lead from one of the axial conduits 23, 24 to the one or the other end portion of the sealing gap 40. The arrangement of these two radial bores is such that the end portion of the sealing gap 40 facing the side opposed to the pressure carrying snap ring grove 33 or 34 is respectively effectively supplied with pressure oil via the associated radial bore 41 or 42. As illustrated, the radial bore 42 functionally associated with the left snap ring grove 33 is located at the right end portion of the sealing gap 40, and the radial bore 41 associated with the now pressure-free right snap ring grove 34 is positioned at the left end of the sealing gap 40.

The pressure oil flows out of the sealing gap 40 at both ends and is extracted from the distributor housing in a pressure-free way via conduits 44, 45 and an outlet 46 after having flown through each of the two roller bearings 38, 39.

In the embodiment shown the cylinder casing 4, its lid 5 and also the distributor housing 29 consist of a light metal, preferably of an Al alloy. In this way, the inertia moments of the rotating cylinder casing 4 and the lid 5 are considerably reduced as compared to the conventional embodiments made of steel. The piston 12 and its two piston rods 14, 22 rotating together with it consist of a tool steel. To minimise wear, the inner wall of the distributor housing 29 bordering the sealing gap 40 as well as the inner wall 11a of the work chamber 11 in the cylinder casing 4 are hard coated. In the so-called hard coating of aluminium bodies, a ceramic like layer mainly consisting of wear resistant and extremely hard aluminium oxides with a hardness of 1100 to 1300 Hv and a pore diameter of 8 to 12% is formed on the respective surface by hard anodic oxidation. By impregnation of this layer with PTFE (polytetrafluor ethylene), i.e. by dispersion of PTFE into the pores, the friction coefficient is considerably reduced so that finally a wear resistant surface layer with excellent sliding properties is produced on the wall of the bore in the distributor housing bordering the sealing gap 40.

For optimising the wear reduction the sliding surfaces of the piston 12 and the piston rods 14, 22 are hard coated, namely with a particularly hard and dense chrome layer with a hardness of at least 1100 Hv consisting of at least 99% of chrome. As compared to conventional chrome or nickel coatings, the hard coated sliding surfaces are characterised by a considerably increased wear resistance, an enhanced corrosion resistance and more favourable sliding properties. All in all, therefore, by hard coating the sliding surfaces of the Al components and by hard chrome plating the piston and piston rod components, a considerable decrease of wear is achieved, which ensures an exact constancy of the sealing gap even after long operating times and thus an intensive cooling and lubrication effect due to the pressure oil uniformly flowing through the sealing gap.

For a further enhancement of the heat dissipation the clamping cylinder according to the invention is provided with an air conduction system generating an air flow indicated by arrows in FIG. 2 and flowing through the distributor housing 29. For this purpose, an air conduction sheet 50 is fixed to the cylindrical part of the distributor housing 29, which air conduction sheet 50 extends over approximately half of the circumference of the distributor housing 29 and axially blends into an oblique portion 51 to which a partly cylindrical portion is annexed which surrounds at least part of the cylinder housing in a radial distance. Due to the rotation of the cylinder housing a rotating air flow is generated which is still amplified by attachment screws 53 for the lid 5 of the casing as well as by a radial collar 54. A part of this air flow is guided to the direction of the distributor housing by the conduction sheet 50 to 52 and flows through axial groves 55 formed in the distributor housing 29.

To the part 52 of the conduction sheet surrounding the cylinder casing 4, additionally, two approximation switches 60, 61 are switchably attached.

The invention is not limited to the previously described embodiment, but also includes various other embodiments of individual components of the clamping cylinder. In particular, the invention also comprises the so called hollow clamping cylinders in which a through bore for accommodating the rod material extends through the whole cylinder body structure, i.e. through the cylinder body 1 and the distributor 2. Variations of the invention further comprise coatings of the sliding surfaces of the pistons and piston rods used in the clamping cylinders as well as of the sliding surfaces of the components made of light metal, particularly of the distributor housing, which have qualitative features comparable to those of the hard chrome coatings on the piston components or the hard coatings on the components made of light metal.

What is claimed is:

1. Clamping cylinder for operating the chuck particularly of a turning machine, comprising:

a cylinder casing (4) including a cover plate (5) mounted on the face side, a piston (12) axially shiftable in a work chamber (11) of the cylinder casing (4) for generating the clamping force, the piston rod of said piston being capable of being directly or indirectly coupled to the chuck, and a distributor (2) located axially adjacent to the cylinder housing (4) in a fixed position and provided with a conduit system (31 to 34) for introducing and removing a pressure means into and from the work chamber (12), characterised in that the cylinder casing (4), the lid (5) of the casing and the distributor housing (29) are made of a light metal, the sliding surfaces of the aligned bores (7, 8; 11) in the cylinder housing and of the bore in the distributor housing (29) for accommodating the piston rods (14, 15) integrally formed with the piston (12) are hard coated, the piston (12) and the piston rods (14, 15) integrally formed at both its sides are formed of a steel and have hard chrome plated sliding surfaces, and a radial bore (41; 42) extends from at least one pressure means conduit (23 or 24) provided in the piston rod (22) to the sealing gap (40) between the piston rod (22) and the distributor housing (29).

2. Clamping cylinder according to claim 2, characterised in that a radial bore (41 or 42) extends from each of the axial conduits (23, 24) with parallel axes provided in the piston rod (22) to the sealing gap (40).

3. Clamping cylinder according to claim 2, characterised in that two snap ring groves (33, 34) are positioned between the two radial bores (41; 42), the axially outer radial bore (41) being functionally allocated to the axially inner snap ring grove (34) and the axially inner radial bore (42) being functionally allocated to the axially outer snap ring grove (33).

4. Clamping cylinder according to one of the claims 1 to 3, characterised in a conduction system (52 to 55) for generating a cooling air flow through the distributor housing (29).

5. Clamping cylinder according to one of the claims 1 to 4, characterised in that recesses for reducing the weight and for guiding the cooling air are formed in the distributor housing (29).

6. Clamping cylinder according to claim 4 or 5, characterised in that a partially cylindrical conduction sheet (50) is fixed to the cylindrical part of the distributor housing (29), said conduction sheet (50) at least partially surrounding the rotating cylinder casing with its extended end portion (52) in a radial distance, and in that several axial conduits (55) displaced along the circumference in distances are disposed in the distributor housing (29), through which axial conduits (55) the generated cooling air flow flows.

7. Clamping cylinder according to one of the claims 1 to 6, characterised in that approximation switches (60, 61) are provided for detecting the respective position of the piston (12).

* * * * *